United States Patent

[11] 3,626,070

[72] Inventor Edward John Soboczenski
      Chadds Ford, Pa.
[21] Appl. No. 714,440
[22] Filed Mar. 20, 1968
[45] Patented Dec. 7, 1971
[73] Assignee E. I. du Pont de Nemours and Company
      Wilmington, Del.

[54] SUBSTITUTED 2-AMINOBENZIMIDAZOLES AS ANTHELMINTICS
6 Claims, No Drawings

[52] U.S. Cl. .................................... 424/273,
                                                260/309.2
[51] Int. Cl. ................................... A61k 27/00
[50] Field of Search ........................... 424/273,
                                                200; 260/309.2

[56] References Cited
FOREIGN PATENTS
698,071  7/1967  Belgium

Primary Examiner—Sam Rosen
Attorney—Lynn N. Fisher

ABSTRACT: Substituted 2-aminobenzimidazoles of the general formula:

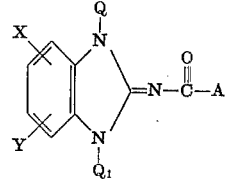

where X, Y, A, $Q_1$ and Q are as defined hereinafter; are useful as anthelmintics. $Q_1$ includes groups such as carbamoyl and perhaloalkylmercapto while Q includes such groups as hydrogen, carbamoyl, acyl, perhaloalkylmercapto, methyl, and an exemplary species of the general class is the compound:

methyl 1-(butylcarbamoyl)-2-benzimidazolecarbamate.

SUBSTITUTED 2-AMINOBENZIMIDAZOLES AS ANTHELMINTICS

BACKGROUND OF THE INVENTION

The infection helminthiasis involves infestation of the body of warm-blooded animals, and particularly, the gastrointestinal tract, with various species of parasitic worms. It is a very widespread and serious disease, and methods for its treatment and prevention are of economic importance.

SUMMARY OF THE INVENTION

The compounds of the present invention possess activity against helminth parasites of warm-blooded animals. Properly formulated and administered, they can be utilized for the treatment of helminthiasis of animals by oral administration.

For example, the subject compounds are useful for the control of infections such as *Trichuris vulpis* in dogs and gastroenteritis in sheep due to such parasites as *Ostertagia*, *Haemonchus* and *Cooperi* species. In addition nematodes in laboratory mice such as *Aspicularis teraptera* and others may also be checked. Various ancylostomes such as *Bunestomium trigenecephalum* and *Ancylostoma caninum* are also controlled by the compounds of this invention.

Anthelmintic activity is obtained by oral administration of the compounds of this invention mixed with a suitable nontoxic carrier to obtain the active anthelmintic composition. The carrier can be a pharmaceutically acceptable diluent or excipient normally used for the preparation of medicaments and includes such materials as lactose, calcium, phosphate, gelatin, pectin and others. Liquid carriers may be selected from such agents as olive oil, sesame oil and water. Alternatively the active ingredients of this invention may be incorporated in a receptacle such as a hard or soft gelatin capsule. The quantity of the active ingredient administered to the animal is in the range of 20 to 1,200 mg./kg./day.

The compounds which possess the anthelmintic activity are represented by the following structural formula:

FORMULA I

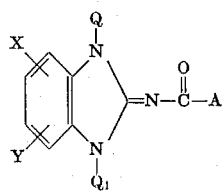

wherein A is $OR_1$ or $R_6$; $Q_1$ is $SZ$ or

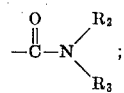

Q is hydrogen; methyl; methyl substituted with cyano, OR or COOR; alkylsulfonyl of one through six carbon atoms; phenylsulfonyl; phenylsulfonyl substituted with methyl, ethyl, methoxy or halogen; benzylsulfonyl; benzylsulfonyl substituted with methyl, ethyl, methoxy or halogen; alkenyl of three to four carbon atoms; propargyl; cyano;

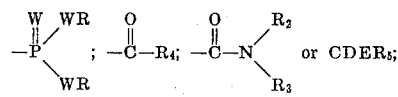

provided that the total carbon content of $R_2$, $R_3$ and Q can not exceed 18 carbon atoms;

R is methyl or ethyl;

$R_1$ is alkyl of one through four carbon atoms or allyl;

$R_2$ is hydrogen, alkyl of one through six carbon atoms, alkenyl of three through six carbon atoms or alkynyl of three through six carbon atoms;

$R_3$ is hydrogen; alkyl of one through 18 carbon atoms; alkyl of one through 18 carbon atoms substituted with halogen, alkoxy of one through four carbon atoms, or alkoxycarbonyl of two through four carbon atoms; alkenyl of three through 18 carbon atoms; alkenyl of three through 18 carbon atoms substituted with halogen, alkoxy of one through four carbon atoms, or alkoxycarbonyl of two through four carbon atoms; alkynyl of three through 18 carbon atoms; alkynyl of three through 18 carbon atoms substituted with halogen, alkoxy of one through four carbon atoms, or alkoxycarbonyl of two through four carbon atoms; cycloalkyl of three through 10 carbon atoms, cycloalkyl of three through 10 carbon atoms substituted with methyl, methoxy or chlorine; cycloalkenyl of four through eight carbon atoms; cycloalkenyl of four through eight carbon atoms substituted with methyl, methoxy or chlorine; bicycloalkyl of seven through 10 carbon atoms; bicycloalkenyl of seven through 10 carbon atoms; (cycloalkyl)alkyl of four through nine carbon atoms; (cycloalkyl)alkyl of four through nine carbon atoms substituted with methyl, methoxy, or chlorine; (cycloalkenyl)alkyl of five through nine carbon atoms; aralkyl of five through eight carbon atoms; aralkyl of five through eight carbon atoms substituted with alkyl of one through four carbon atoms, chloroalkyl of one through four carbon atoms, fluoroalkyl of one through four carbon atoms, alkoxy of one through four carbon atoms, halogen, cyano, alkoxycarbonyl of two through three carbon atoms, alkylsulfonyl of one through four carbon atoms, or nitro; phenyl; phenyl substituted with alkyl of one through four carbon atoms, chloroalkyl of one through four carbon atoms, fluoroalkyl of one through four carbon atoms, alkoxy of one through four carbon atoms, halogen, cyano, alkoxycarbonyl of two through three carbon atoms, alkylsulfonyl of one through four carbon atoms, or nitro; alkylsulfonyl of one through 18 carbon atoms; phenylsulfonyl; phenylsulfonyl substituted with alkyl of one through four carbon atoms, alkoxy of one through four carbon atoms, halogen, cyano, alkoxycarbonyl of two through three carbon atoms, or nitro; acyl of one through 18 carbon atoms; acyl of one through 18 carbon atoms substituted with halogen or alkoxy of one through four carbon atoms; aroyl of six through 10 carbon atoms; or aroy of six through 10 carbon atoms substituted with alkyl of one through four carbon atoms, halogen, nitro, alkylsulfonyl of one through four carbon atoms or alkoxy of one through four carbon atoms;

provided that when $R_2$ and $R_3$ are both substituents on the same nitrogen, they can be taken together to be $-(CH_2)_n-$ where $n$ is two to eight or $-(CH_2)_2-O-(CH_2)_2-$;

$R_4$ is hydrogen; alkyl of one through 12 carbon atoms; alkyl of one through 12 carbon atoms substituted with hydroxy, $-OR_1$, cyano, acetoxy, chlorine or fluorine; alkynl of two through 10 carbon atoms; alkenyl of two through 10 carbon atoms; cycloalkyl of three through eight carbon atoms; chlorine; alkoxycarbonyl of two to five carbons; or aryl of the type

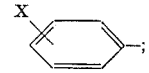

$R_5$ is alkyl of one through 12 carbons, alkenyl of three through 10 carbons, alkynyl of three through 10 carbons, cycloalkyl of three through eight carbons, (cycloalkyl)alkyl of seven through 10 carbons, phenyl or benzyl;

$R_6$ is hydrogen, alkyl of one through three carbons or cycloalkyl of three through four carbons;

D, E and W are oxygen or sulfur;

X is hydrogen, halogen, alkyl of one through four carbon atoms, nitro, or alkoxy of one through four carbon atoms;

Y is hydrogen, chlorine, or bromine; and

Z is alkyl of one through six carbon atoms; alkyl of one through six carbon atoms substituted with chlorine or fluorine; phenyl; phenyl substituted with nitro, chlorine, fluorine, alkoxy of one through four carbon atoms, methyl, halomethyl, or alkylsulfonyl of one through four carbon atoms; benzyl; or benzyl substituted with nitro, chlorine, fluorine, methyl, halomethyl, alkoxy or one through four carbon atoms, or alkylsulfonyl of one through four carbon atoms.

Preferred within formula I in view of their higher activity are compounds of the formula:

FORMULA IA

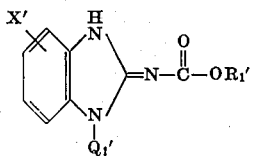

wherein
X' is hydrogen or alkyl of one through four carbon atoms;

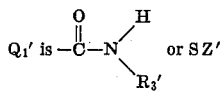

$R_1'$ is methyl, ethyl, isopropyl and sec-butyl;
$R_3'$ is alkyl of one through 12 carbon atoms; phenyl; phenyl substituted with methyl, ethyl, methoxy, ethoxy, nitro, $CF_3$, $CH_3SO_2$ or halogen; benzyl; benzyl substituted with methyl, nitro, methoxy or halogen; (cycloalkyl)alkyl of seven through eight carbon atoms; (cycloalkyl)alkyl of seven through eight carbon atoms substituted with methyl; cyclohexyl; or cyclohexyl substituted with methyl; and
Z' is alkyl of one through three carbon atoms; alkyl of one through three carbon atoms substituted with chlorine; phenyl; phenyl substituted with methyl, nitro or chlorine; benzyl; or benzyl substituted with methyl, nitro or chlorine.

Preferred within formula I in view of the ease in preparation are the compounds of the following formula:

FORMULA IB

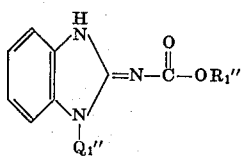

wherein
$Q_1''$ is $-CONHR_3''$ or $SZ''$;
$R_1''$ is methyl, ethyl or isopropyl;
$R_3''$ is alkyl of one through eight carbon atoms; and
$Z''$ is trichloromethyl or 2,4-dinitrophenyl.

Most preferred are the following compounds:
1-butylcarbamoyl-2-benzimidazolecarbamic acid, methyl ester
1-butylcarbamoyl-2-benzimidazolecarbamic acid, ethyl ester
1-butylcarbamoyl-2-benzimidazolecarbamic acid, isopropyl ester
1-hexylcarbamoyl-2-benzimidazolecarbamic acid, methyl ester
1-(trichloromethylthio)-2-benzimidazolecarbamic acid, methyl ester
1-(trichloromethylthio)-2-benzimidazolecarbamic acid, ethyl ester It has not been entirely established whether the trisubstituted benzimidazoles of formula I have structures (A), (B) or structure (C) below:

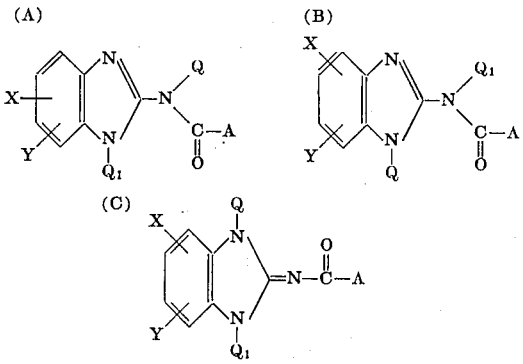

For the purpose of this description, all the trisubstituted compounds are named as the 1,2,3-trisubstituted benzimidazolines (structure C) with the understanding that the invention covers the corresponding pure 1,N-N-trisubstituted positional isomers and isomeric mixtures thereof as they are likely to occur.

DETAILED DESCRIPTION OF THE INVENTION

The compounds within formula I can be prepared by any of a variety of methods known in the art. The preparation is described in detail in assignee's pending application, Ser. No. 629,900, filed Apr. 11, 1967, and in Belgian Pat. No. 698,071, granted July 14, 1967, The preparation disclosure of these references is incorporated herein by reference.

Exemplary of the compounds of formula I are the following specific compounds:
1-(methylcarbamoyl)-2-benzimidazolecarbamic acid, methyl ester
1-(octylcarbamoyl)-2-benzimidazolecarbamic acid, sec-butyl ester
1-(dodecylcarbamoyl)-2-benzimidazolecarbamic acid, methyl ester
1-(phenylcarbamoyl)-2-benzimidazolecarbamic acid, methyl ester
1-(p-tolylcarbamoyl)-2-benzimidazolecarbamic acid, isopropyl ester
1(p-ethoxyphenylcarbamoyl)-2-benzimidazolecarbamic acid, methyl ester
1-(m-chlorophenylcarbamoyl)-2-benzimidazolecarbamic acid, ethyl ester
1-(o-nitrobenzylcarbamoyl)-2-benzimidazolecarbamic acid, isopropyl ester
1-(cyclohexylmethylcarbamoyl)-2-benzimidazolecarbamic acid, methyl ester
1-(2-methylcyclohexylmethylcarbamoyl)-2-benzimidazolecarbamic acid, ethyl ester
1-(pentachloroethylthio)-2-benzimidazolecarbamic acid, methyl ester
1-(2,4-dichlorophenylthio)-2-benzimidazolecarbamic acid, methyl ester
1-(p-chlorophenylthio)-2-benzimidazolecarbamic acid, ethyl ester
1-(m-tolylthio)-2-benzimidazolecarbamic acid, methyl ester
1-(dimethylcarbamoyl)-2-benzimidazolecarbamic acid, ethyl ester
1-(dihexylcarbamoyl)-2-benzimidazolecarbamic acid, methyl ester
1-(octadecylcarbamoyl)-2-benzimidazolecarbamic acid, methyl ester 1-(allylcarbamoyl)-2-benzimidazolecarbamic acid, isopropyl ester
1-(propargycarbamoyl)-2-benzimidazolecarbamic acid, methyl ester
1-(dodecenylcarbamoyl)-2-benzimidazolecarbamic acid, methyl ester
1-[(3-methoxypropyl)carbamoyl]-2-benzimidazolecarbamic acid, methyl ester
1-[(2-methoxycarbonylmethyl)carbamoyl]-2-benzimidazolecarbamic acid, methyl ester
1-(cyclopropylcarbamoyl)-2-benzimidazolecarbamic acid, isobutyl ester
1-(cyclooctylcarbamoyl)-2-benzimidazolecarbamic acid, methyl ester
1-(cyclobuten-1-ylcarbamoyl)-2-benzimidazolecarbamic acid, methyl ester
1-(cycloocten-1-ylcarbamoyl)-2-benzimidazolecarbamic acid, methyl ester
1-(4-methoxycyclohexyl)carbamoyl-2-benzimidazolecarbamic acid, methyl ester
1-[(N-methyl, N-cyclohexyl)carbamoyl]-2-benzimidazolecarbamic acid, methyl ester
1-[2-([2·2·2]-bicyclooctyl)carbamoyl]-2-benzimidazolecarbamic acid, methyl ester
1-(cyclohexylmethylcarbamoyl)-2-benzimidazolecarbamic acid, methyl ester
1-[(2-methoxybutyl)methylcarbamoyl]-2-benzimidazolecarbamic acid, methyl ester
1-(cycloocten-1-ylmethylcarbamoyl)-2-benzimidazolecarbamic acid, methyl ester
1-(furfurylcarbamoyl)-2-benzimidazolecarbamic acid, ethyl ester
1-(benzlcarbamoyl)-2-benzimidazolecarbamic acid, methyl ester
1-(phenylcarbamoyl)-2-benzimidazolecarbamic acid, isopropyl ester
1-[(m-methoxyphenyl)carbamoyl]-2-benzimidazolecarbamic acid, methyl ester
1-[(p-nitrophenyl)carbamoyl]-2-benzimidazolecarbamic acid, methyl ester
1-[(4-carboxyethylphenyl)carbamoyl]-2-benzimidazolecarbamic acid, methyl ester
1-{[p-methylsulfonyl)phenyl]carbamoyl}-2-benzimidazolecarbamic acid, methyl ester
1-(methylsulfonamidocarbonyl)-2-benzimidazolecarbamic acid, methyl ester
1-(phenylsufonaminocarbonyl)-2-benzimidazolecarbamic acid, methyl ester
1-[(p-chlorophenyl)sulfoamidocarbonyl]-2-benzimidazolecarbamic acid, methyl ester
1-(acetamidocarbonyl)-2-benzimidazolecarbamic acid, methyl ester
1-(octanoylamidocarbonyl)-2-benzimidazolecarbamic acid, ethyl ester
1-(2,2-dichloropropionamidocarbonyl)-2-benzimidazolecarbamic acid, ethyl ester
1-(benzoylamidocarbonyl)-2-benzimidazolecarbamic acid, methyl ester
1-[(p-chlorobenzoylamido)carbonyl]-2-benzimidazolecarbamic acid, methyl ester
N-butyl-2-formamido-1-benzimidazolecarboxamide
2-acetamido-N-butyl-1-benzimidazolecarboximide
2-butyramido-N-isopropyl-1-benzimidazolecarboxamide
2-(cyclopropanecarboxamido)-N-ethyl-1-benzimidazolecarboxamide
1-(butylcarbamoyl)-3-methyl-$\Delta^{2,N2}$-benzimidazolinecarbamic acid, ethyl ester
1-(hexycarbamoyl)-3-(methylsulfonyl)-$\Delta^{2,N2}$-benzimidazolinecarbamic acid, methyl ester
1-(ethylcarbamoyl)-3-(hexylsulfonyl)-$\Delta^{2,N2}$-benzimidazolinecarbamic acid, methyl ester
1-(methylcarbamoyl)-3-(phenylsulfonyl)-$\Delta^{2,N2}$-benzimidazolinecarbamic acid, ethyl ester
1-(p-nitrophenylcarbamoyl)-3-(p-chlorophenylsulfonyl)-$\Delta^{2,N2}$-benzimidazolinecarbamic acid, methyl ester
1-(butylcarbamoyl)-3-(p-methoxybenzylsulfonyl)-$\Delta^{2,N2}$-benzimidazolinecarbamic acid, methyl ester
1-(N-methyl-N-phenylcarbamoyl)-3-allyl-$\Delta^{2,N2}$-benzimidazolinecarbamic acid, sec-butyl ester
1-(N,N-dimethylcarbamoyl)-3-propargyl-$\Delta^{2,N2}$-benzimidazolinecarbamic acid, isopropyl ester
1-(ethylcarbamoyl)-3-cyano-$\Delta^{2,N2}$-benzimidazolinecarbamic acid, ethyl ester
1-(trichloromethylthio)-3-[methylthio(thiocarbonyl)]-$\Delta^{2,N2}$-benzimidazolinecarbamic acid, methyl ester
1-(butylcarbamoyl)-3-[(dodecylthio)carbonyl]-$\Delta^{2,N2}$-benzimidazolinecarbamic acid, methyl ester
1-(butylcarbamoyl)-3[ethoxy(thiocarbonyl)]-$\Delta^{2,N2}$-benzimidazolinecarbamic acid, methyl ester
1-(butylcarbamoyl)-3-[(allylthio)carbonyl]-$\Delta^{2,N2}$-benzimidazolinecarbamic acid, methyl ester
1-(ethylcarbamoyl)-3-[(propargylthio)carbonyl]-$\Delta^{2,N2}$-benzimidazolinecarbamic acid, methyl ester
1-(ethylcarbamoyl)3[(cyclopropylthio)carbonyl]-$\Delta^{2,N2}$-benzimidazolinecarbamic acid, ethyl ester
1-(trichloromethylthio)-3-[(cyclohexylthio)carbonyl]-$\Delta^{2,N2}$-benzimidazolinecarbamic acid, isopropyl ester 1-(butylcarbamoyl)-3-[(cyclohexylmethoxy)carbonyl]-$\Delta^{2,N2}$-benzimidazolinecarbamic acid, methyl ester
1-(butylcarbamyl)-3-[(phenylthio)carbonyl]-$\Delta^{2,N2}$-benzimidazolinecarbamic acid, methyl ester
1-(butylcarbamyl)-3-[(benzylthio)carbonyl]-$\Delta^{2,N2}$-benzimidazolinecarbamic acid, methyl ester
1-(morpholinocarbonyl)-2-benzimidazolecarbamic acid, methyl ester
1-(piperidinocarbonyl)-2-benzimidazolecarbamic acid, methyl ester
1-(aziridinocarbonyl)-2-benzimidazolecarbamic acid, methyl ester
1-carbamoyl-2-benzimidazolecarbamic acid, methyl ester
1-allyl-3-benzylthio-$\Delta^{2,N2}$-benzimidazolinecarbamic acid, methyl ester
1-propargyl-3-(diethylphosphinyl)-$\Delta^{2,N2}$-benzimidazolinecarbamic acid, methyl ester
1-(butylcarbamoyl)-3-[di-(ethylthio)phosphinyl]-$\Delta^{2,N2}$-benzimidazolinecarbamic acid, methyl ester
1,3-bis(trichloromethylthio)-$\Delta^{2,N2}$-benzimidazolinecarbamic acid, isopropyl ester
1,3-bis(butylcarbamoyl)-$\Delta^{2,N2}$-benzimidazolinecarbamic acid, methyl ester
1-(butylcarbamoyl)-3-(trichloromethylthio)-$\Delta^{2,N2}$-benzimidazolinecarbamic acid, methyl ester
1-(butylcarbamoyl)-5-butyl-2-benzimidazolecarbamic acid, methyl ester
1-(butylcarbamoyl)-4,7-dichloro-2-benzimidazolecarbamic acid, ethyl ester
1-(butylcarbamoyl)-5-methyl-2-benzimidazolecarbamic acid, ether ester
1-(butylcarbamoyl)-5-nitro-2-benzimidazolecarbamic acid, methyl ester
1-(butylcarbamoyl)-5-methoxy-2-benzimidazolecarbamic acid, isopropyl ester
1-(isobutylcarbamoyl)-2-benzimidazolecarbamic acid, methyl ester
1-(methylcarbamoyl)-2-benzimidazolecarbamic acid, sec-butyl ester
1-(9-decenylcarbamoyl)-2-benzimidazolecarbamic acid, methyl ester
1-(p-tolylsulfonylcarbamoyl)-2-benzimidazolecarbamic acid, isopropyl ester
1-(ethoxycarbonylmethylcarbamoyl)-2-benzimidazolecarbamic acid, ethyl ester
1-(allylcarbamoyl)-2-benzimidazolecarbamic acid, ethyl ester
1-(p-cyanophenylcarbamoyl)-2-benzimidazolecarbamic acid, isopropyl ester
1-(p-methoxyphenylcarbamoyl)-2-benzimidazolecarbamic acid, methyl ester
1-(allylcarbamoyl)-2-benzimidazolecarbamic acid, methyl ester 1-(ethylcarbamoyl)-2-benzimidazolecarbamic acid, methyl ester 1-(3,4-dichlorophenylcarbamoyl)-2-benzimidazolecarbamic acid, methyl ester 1-(isopropylcarbamoyl)-2-benzimidazolecarbamic acid, methyl ester 1-(cyclohexylcarbamoyl)-2-benzimidazolecarbamic acid, methyl ester 1-(p-nitrophenylcarbamoyl)-2-benzimidazolecarbamic acid, methyl ester 1-(p-cyanophenylcarbamoyl)-2-benzimidazolecarbamic acid, methyl ester 1-(hexylcarbamoyl)-2-benzimidazolecarbamic acid, allyl ester 1-(butoxycarbonylmethylcarbamoyl)-2-benzimidazolecarbamic acid, isopropyl ester 1-(cyclohexylcarbamoyl)-2-benzimidazolecarbamic acid, isopropyl ester 1-(p-nitrophenylcarbamoyl)-2-benzimidazolecarbamic acid, isopropyl ester 1-(allylcarbamoyl)-2-benzimidazolecarbamic acid, isopropyl ester 1-(methylcarbamoyl)-2-benzimidazolecarbamic acid, isopropyl ester 1-(hexylcarbamoyl)-2-benzimidazolecarbamic acid, isopropyl ester 1-(butylcarbamoyl)-2-benzimidazolecarbamic acid, isopropyl ester 1-(dodecylcarbamoyl)-2-benzimidazolecarbamic acid, methyl ester 1-(octylcarbamoyl)-2-benzimidazolecarbamic acid, methyl ester 1-(methylcarbamoyl)-3-propionyl-$\Delta^{2,N}$-benzimidazoline- 2-carbamic acid, methyl ester 1,N-dicarbamoyl-2-benzimidazolecarbamic acid, methyl ester 1-(2-methylcyclohexylcarbamoyl)-2-benzimidazolecarbamic acid, methyl ester 1-(hexylcarbamoyl)-2-benzimidazolecarbamic acid, methyl ester 1,3-bis-(methylcarbamoyl)-$\Delta^{2,N}$-2-benzimidazolinecarbamic acid, methyl ester 1-(3-chloro-p-tolylcarbamoyl)-2-benzimidazolecarbamic acid, methyl ester 1-(m-tolylcarbamoyl)-2-benzimidazolecarbamic acid, methyl ester 1-(o-tolylcarbamoyl)-2-benzimidazolecarbamic acid, methyl ester 1-(ethoxycarbonylmethyl carbamoyl)-2-benzimidazolecarbamic acid, methyl ester 1-(p-tolylcarbamoyl)-2-benzimidazolecarbamic acid, methyl ester 1-(p-ethoxyphenylcarbamoyl)-2-benzimidazolecarbamic acid, methyl ester 1-(cyclohexylmethylcarbamoyl)-2-benzimidazolecarbamic acid, methyl ester 1-(benzylcarbamoyl)-2-benzimidazolecarbamic acid, methyl ester 1-(ethoxycarbonylmethylcarbamoyl)-2-benzimidazolecarbamic acid, isopropyl ester 1-(o-nitrophenylcarbamoyl)-2-benzimidazolecarbamic acid, methyl ester 1-methylcarbamoyl-2-benzimidazolecarbamic acid, methyl ester 3-phenylcarbamoyl-2-benzimidazolecarbamic acid, methyl ester 1,3-bis(trichloromethylthio)-$\Delta^{2,N}$-2-benzimidazolinecarbamic acid, methyl ester 1-trichloromethylthio-2-benzimidazolinecarbamic acid, methyl ester 1-(o-nitrophenylthio)-2-benzimidazolecarbamic acid, isopropyl ester 1-(2,4-dinitrophenylthio)-2-benzimidazolecarbamic acid, isobutyl ester 1-(2,4-dinitrophenylthio)-2-benzimidazolecarbamic acid, isopropyl ester 1-(2,4-dinitrophenylthio)-2-benzimidazolecarbamic acid, ethyl ester 1-(trichloromethylthio)-2-benzimidazolecarbamic acid, ethyl ester 1-(methylcarbamoyl)-3-(trichloromethylthio)-$\Delta^{2,N}$-benzimidazoline-2-carbamic acid, methyl ester 1-(2,4-dinitrophenylthio)-2-benzimidazolecarbamic acid, methyl ester As previously set forth, the compounds of formula I are formulated for oral administration to warm-blooded animals for the treatment of helminthiasis.

In formulating the active ingredient, it is mixed with a suitable nontoxic carrier. This carrier can be a pharmaceutically acceptable diluent such as lactose, calcium phosphate, gelatin, pectin, olive oil, sesame oil, water and others. Alternatively, the active ingredient can be incorporated into a gelatin capsule.

The quantity of the active ingredient administered to the warm-blooded animal lies in the range of 20 to 1,200 mg./kg./day.

The anthelmintics of formula I can be mixed with other known anthelmintics in order to achieve beneficial effects such as lower dose rate, greater than additive effect, broader spectrum activity, etc.

The following are illustrative of the anthelmintics which may be included in compositions with the compounds of this invention. Generally they may be present in the ratio of 1:10 to 10:1.

piperazine
thiabendazole
phenothiazine
copper sulfate
0,0-dimethyl-2,2,2-trichloro-1-hydroxyethylphosphonate.
chloromethyl derivative of dimethyl-dehydrothio-p-toluidine
(Thio Flavin T)

As previously set forth, the compounds of this invention are useful for the treatment of helminth infections of economically important farm animals. The following examples illustrate this activity. All proportions are in parts by weight unless otherwise indicated.

EXAMPLE 1

When 1-(butylcarbamoyl)-2-benzimidazolecarbamic acid, methyl ester is administered orally to sheep at 250 mg./kg. in the form of a drench or capsule, *Haemonchus, Ostertagia, Strongyloides, Cooperia* and other helminths of the abomasum, small and large intestines are removed.

When cattle are treated with 250 mg./kg. of this compound administered orally in the form of a drench or capsule, *Ostertagia, Cooperia, Strongyloides* and other helminth parasites are eliminated from the treated animals.

Equally satisfactory results are obtained against infections in swine with *Ascaris suum, Strongyloides ransomi*, and *Trichuris suis* from treatment by a dosage in the form of a capsule at 100 mg./kg./day. Incorporation of 1-(butylcarbamoyl)-2-benzimidazolecarbamic acid, methyl ester in swine feed at 0.05 percent is successful in suppressing the verminous pneumonia of pigs challenged with living ova of *A. suum*.

Chickens are cleared of helminth infections with *Ascaridia galli* and *Heterakis gallinae* by adding 0.05 percent of the subject compound to the poultry feed and feeding the infected birds for 24 hours on this ration.

The following compounds may be individually substituted for the 1-(butylcarbamoyl)-2-benzimidazolecarbamic acid, methyl ester above, and when used as indicated give similar results.

1-(trichloromethylthio)-2-benzimidazolecarbamic acid, methyl ester

1(-methylcarbonyl)-2-benzimidazolecarbamic acid, methyl ester

1(ethoxycarbonylmethylcarbamoyl)-2-benzimidazolecarbamic acid, isopropyl ester

1(p-nitrophenylcarbamoyl)-2-benzimidazolecarbamic acid, methyl ester

EXAMPLE 2

When 1-(butylcarbamoyl)-2-benzimidazolecarbamic acid, methyl is administered orally by intubation to mice as a single dose of 500 mg./kg. or in the feed at the level of 0.05 percent for 6 consecutive days, adult worms of the species *Aspicularis tetraptera* and *Syphacia obvelata* are removed from the cecum and *Nematospiroides dubius, Nippostrongylus muris,* and *Hymenolepis nana* are removed from the small intestine.

EXAMPLE 3

When 1-(butylcarbamoyl)-2-benzimidazolecarbamic acid, methyl ester is administered to mice in the feed at the level of 0.05 percent for 6 consecutive days, beginning 1 day prior to oral inoculation with 50,000 to 100,000 infective ova of *Ascaris suum,* the mice are protected against the lethal effects of the infection of the lungs and liver by migrating larvae.

EXAMPLE 4

When 1-(butylcarbamoyl)-2-benzimidazolecarbamic acid, methyl ester is administered orally in the form of a drench or capsule or intraruminally to sheep as a single dose of 250 mg./kg., adults of *Haemonchus contortus, Trichostrongylus spp., Ostertagia spp., Strongyloides papillosus, Cooperia spp., Oesophagostomum spp., Nematodirus spp., Bunostomum trigonocephalum, Chabertia ovina, Moniezia expansa,* and *Thysamosoma actinioides* are removed from the gastrointestinal tract.

EXAMPLE 5

When 1-(butylcarbamoyl)-2-benzimidazolecarbamic acid, methyl ester is administered orally in the form of a drench or capsule to sheep as a single dose of 250 mg./kg., adult *Fasciola hepatica* are removed from the bile ducts.

EXAMPLE 6

| | |
|---|---|
| 1-(butylcarbamoyl)-2-(benzimidazole carbamic acid, methyl ester | 96.5 |
| hydroxyethyl cellulose | 1.0 |
| sodium "Lorol" sulfate | 2.0 |
| antifoam AF | 0.5 |

The above components are blended and micropulverized to pass through 24 mesh/cm. screen. Capsules containing approximately 250 mg. of the active ingredient are prepared.

When these capsules are administered orally to dogs at the rate of 50 mg./kg./day in two doses per day for 2 consecutive days, *Ancylostomum caninum, Toxacara canis, Toxascaris leonina, Trichocepthalus vulpis, Dipylidium caninum, Taenia pisiformis,* and *Taenia taeniaeformia,* are removed from the intestinal tract.

EXAMPLE 7

| | |
|---|---|
| 1-(butylcarbamoyl)-2-benzimidazolecarbamic acid, ethyl ester | 95.0 |
| sodium alginate | 3.0 |
| gum karaya | 1.5 |
| sodium "Lorol" sulfate | .5 |

The dry ingredients are blended, micropulverized and packaged in 5gram packets. Just prior to use, the contents of a packet is stirred with three times its weight of water to form a smooth suspension and used as a drench for horses (100 mg./kg.). Various species of parasites commonly grouped into (a) the large strongyles, such as *Strongylus vulgaris,* and (b) the small strongyles, such as *Triodontophorus minor; Trichostrongylus axei; Oxyuris equi; Parascaris equorum;* and *Gastrophilus spp.* (horse bots) are removed from their respective habitats in the gastrointestinal tract.

EXAMPLE 8

| | |
|---|---|
| 1-(butylcarbamoyl)-2-(5-butyl-benzimidazolecarbamic acid, methyl ester | 2 parts |
| mineral oil | 10 parts |

The active ingredient is micropulverized and then blended with the mineral oil to form a uniform suspension. This is administered orally in the form of a drench or intraruminally to angora goats as a single dose of 250 mg./kg. and adults of *Haemonchus contortus, Trichostrongylus spp., Ostertagia spp., Cooperia spp., Oesophagostonum spp., Nematodirus spp., Bunostomum trigonocephalum, Chabertia ovina, Moniezia expansa,* and *Thysanosoma actinioides* are removed from the gastrointestinal tract.

EXAMPLE 9

| | |
|---|---|
| 1-(butylcarbamoyl)-2-benzimidazole-carbamic acid, isopropyl ester | 1 part |
| phenothiazine | 1 part |
| mineral oil | 8 parts |

The active ingredients are micropulverized separately, then blended together with the mineral oil. This is administered orally to sheep as a drench at the rate of 500 mg./kg. (total active). Good control of *Trichostrongylus spp.* is obtained.

EXAMPLE 10

| | |
|---|---|
| 1-(p-nitrophenylcarbamoyl)-2-benzimidazole-carbamic acid, methyl ester | 49 |
| piperazine | 49 |
| hydroxy ethyl cellulose | 1 |
| sodium "Lorol" sulfate | 1 |

Each of the active ingredients is micropulverized separately and then blended together with the remaining ingredients. Capsules containing approximately 250 mg. of the formulation are prepared. These are administered to dogs at a total dose rate of 150 mg./kg. for control of ascarids and hookworms.

EXAMPLE 11

When 1-(butylcarbamoyl)-2-benzimidazolecarbamic acid, methyl ester is administered orally, preferably in the form of a capsule, to swine as a single dose of 100 mg./kg., adult *Ascaris suum, Strongyloides ransomi, Oesophagostomum spp.,* and *Trichuris suis* are removed from the gastrointestinal tract.

EXAMPLE 12

When 1-(butylcarbamoyl)-2-benzimidazolecarbamic acid, methyl ester is administered to swine in the feed at the level of 0.05 percent for 6 consecutive days, beginning 1 day prior to oral inoculation with approximately 50,000 infective ova of *Ascaris suum,* they are protected from the verminous pneumonia ("thumps") due to the invasion of the lungs by migrating larvae.

EXAMPLE 13

When 1-(butylcarbamoyl)-2-benzimidazolecarbamic acid, methyl ester is administered to calves as a drench or in a capsule or by injection into the rumen as a single dose of 250 mg./kg., adults of *Haemonchus contortus*, *Trichostrongylus*, *spp.*, *Ostertagia spp.*, *Strongyloides papillosus*, *Cooperia spp.*, *Oesophagostomum radiatum*, *Nematodirus spp.*, *Bunostomum*, *phlebotomum*, and *Moniezia expansa* are removed from the gastrointestinal tract.

EXAMPLE 14

When 1-(butylcarbamoyl)-2-benzimidazolecarbamic acid, methyl ester is administered in the feed to chickens and turkeys at a level of 0.05 percent for a period of 24 hours, *Ascaridia galli*, *Heterakis gallinae*, *Raillietina spp.*, *Choanataenia infundibulum*, and *Hymenolepsis spp.* are removed.

EXAMPLE 15

When 1-(butylcarbamoyl)-2-benzimidazolecarbamic acid, methyl ester is administered orally in the form of a drench or capsule to cattle as a single dose of 250 mg./kg. adult *Fasciola hepatica* are removed from the bile duct.

EXAMPLE 16

| | |
|---|---|
| N-[2-(isopropylcarbonylamino)-1-benzimidazolylcarbonyl glycine, ethyl ester | 95 |
| sodium alginate | 3.0 |
| gum karay | 1.5 |
| sodium "Lorol" sulfate | 0.5 |

The dry ingredients are blended, micropulverized and packaged in 50 gram, 25 gram and 12.5 gram packets. Just prior to use the contents of a packet is stirred with three to five times its weight of water to form a smooth suspension. It is administered as a drench to domestic ruminants at the rate of 1,000 mg./kg. for the control of parasitic round worms of the genus *Haemonchus*.

All of the specific compounds set forth in the specification can be formulated in a similar fashion and when used as described give similar results.

I claim:

1. A method for treating helminthiasis with comprises administering to orally warm-blooded animals in anthelmintically effective amount of a compound of the formula:

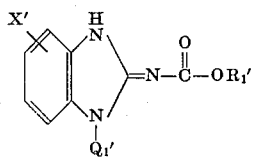

wherein
X' is hydrogen or alkyl of one through four carbon atoms;

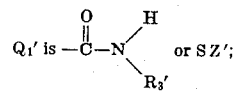

$R_1'$ is methyl, ethyl, isopropyl and sec-butyl;
$R_3'$ is alkyl of one through 12 carbon atoms; phenyl; phenyl substituted with methyl, ethyl, methoxy, ethoxy, nitro, $CF_3$, $CH_3SO_2$ or halogen; benzyl; benzyl substituted with methyl, nitro, methoxy or halogen; (cycloalkyl) alkyl of seven through eight carbon atoms; (cycloalkyl) alkyl of seven through eight carbon atoms substituted with methyl; cyclohexyl; or cyclohexyl substituted with methyl; and
Z' is alkyl of one through three carbon atoms; alkyl of one through three carbon atoms substituted with chlorine; phenyl; phenyl substituted with methyl, nitro or chlorine; benzyl; or benzyl substituted with methyl, nitro or chlorine.

2. A method for treating helminthiasis which comprises administering orally to warm-blooded animals an anthelmintically effective amount of a compound of the formula:

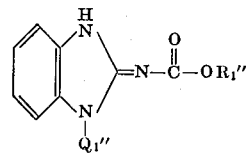

wherein
$Q_1''$ is —$CONHR_3''$ or $SZ''$;
$R_1''$ is methyl, ethyl or isopropyl;
$R_3''$ is alkyl of one through eight carbon atoms; and
$Z''$ is trichloromethyl or 2,4-dinitrophenyl.

3. A method for treating helminthiasis which comprises administering orally to warm-blooded animals an anthelmintically effective amount of 1-(butylcarbamoyl)-2-benzimidazolecarbamic acid, methyl ester.

4. A method for treating helminthiasis which comprises administering orally to warm-blooded animals an anthelmintically effective amount of 1-(p-nitrophenylcarbamoyl)-2-benzimidazolecarbamic acid, methyl ester.

5. A method for treating helminthiasis which comprises administering orally to warm-blooded animals an anthelmintically effective amount of 1-(trichloromethylthio)-2-benzimidazolecarbamic acid, methyl ester.

6. A method for treating helminthiasis which comprises administering orally to warm-blooded animals an anthelmintically effective amount of 1-(ethoxycarbonylmethylcarbamoyl)-2-benzimidazolecarbamic acid, methyl ester.

* * * * *